United States Patent [19]

Davis

[11] E Re. 30,797

[45] Reissued Nov. 17, 1981

[54] ASSOCIATED DYE SALTS AND METHOD OF FORMING COLORED INDICIA THEREWITH

[75] Inventor: Chester Davis, Cincinnati, Ohio

[73] Assignee: Scott Paper Company, Philadelphia, Pa.

[21] Appl. No.: 850,027

[22] Filed: Nov. 9, 1977

Related U.S. Patent Documents

Reissue of:

[64] Patent No.: 3,193,404
Issued: Jul. 6, 1965
Appl. No.: 200,052
Filed: Jun. 5, 1962

U.S. Applications:

[63] Continuation-in-part of Ser. No. 800,377, Mar. 19, 1959, abandoned, which is a continuation-in-part of Ser. No. 658,249, May 10, 1957, abandoned, which is a continuation-in-part of Ser. No. 533,877, Sep. 12, 1955, abandoned, and Ser. No. 533,878, Sep. 12, 1955, abandoned.

[51] Int. Cl.[3] ..... B41M 5/14

[52] U.S. Cl. ..... 427/288; 101/426; 101/DIG. 1; 427/150

[58] Field of Search ..... 427/150, 288; 101/426, 101/DIG. 1; 106/31; 260/391, 570 R, 501.18, 501.21; 282/275; 346/135

[56] References Cited

U.S. PATENT DOCUMENTS

| | | | |
|---|---|---|---|
| 2,164,685 | 7/1939 | Kinyon | 427/153 X |
| 2,286,169 | 6/1942 | Heckenbleikmer | 260/349 |
| 2,307,813 | 1/1943 | Wayne | 260/456 A |
| 2,309,829 | 2/1943 | Davis et al. | 260/456 R |
| 2,332,696 | 10/1943 | Champion | 427/146 X |
| 2,518,249 | 8/1950 | Ott | 260/349 |
| 2,525,052 | 10/1950 | van der Auwera | 96/84 R |
| 2,557,924 | 6/1951 | Schaad | 260/349 |
| 2,559,351 | 7/1951 | Drake et al. | 427/282 |
| 2,634,677 | 4/1953 | Klimkowski | 101/DIG. 1 X |
| 2,646,367 | 7/1953 | Davis et al. | 282/27.5 X |
| 2,654,673 | 10/1953 | Steinhardt | 101/DIG. 1 X |
| 2,695,245 | 11/1954 | Compton | 427/150 X |
| 2,755,203 | 7/1956 | Stallmann | 101/DIG. 1 X |
| 2,900,388 | 8/1959 | Tien | 260/295 H |
| 2,927,040 | 3/1960 | Davis | 427/150 X |
| 2,927,041 | 3/1960 | Davis | 101/DIG. 1 X |
| 2,948,753 | 8/1960 | Kranz | 260/570 R X |
| 2,995,465 | 8/1961 | Steiger | 428/427 |
| 2,995,468 | 8/1961 | Richey | 428/511 |
| 3,096,189 | 7/1963 | Kranz et al. | 106/236 |
| 3,193,404 | 7/1965 | Davis | 427/288 |

FOREIGN PATENT DOCUMENTS

| | | | |
|---|---|---|---|
| 507001 | 11/1954 | Canada | 427/150 |
| 14822 | of 1888 | United Kingdom | 260/390 |

OTHER PUBLICATIONS

Karrer, "Organic Chemistry", 1946, p. 406.

Hinsberg, "Veber Benzolsulfinsäure als Reagens. II", *Berichte der Deutschen Chemischen Gesellschaft,* vol. III (1897), pp. 2803–2805.

Hinsberg, "Über die Reaktion Zwischen Aromatischer Sulfinsäure und Di-und Triphenyl-Carbinol", *Berichte der Deutschen Chemischen Gesellschaft,* vol. 50 (1917), pp. 468–473.

Beilsteins Handbuch der Organischen Chemie, Vierte Auflage, Dreizehnter Band, 1930, pp. 700 and 704.

*Primary Examiner*—James R. Hoffman
*Attorney, Agent, or Firm*—Connolly and Hutz

[57] ABSTRACT

*Described herein are methods of printing which comprise applying to an unfired silicate surface characterized by high ionizing power a substantially colorless associated salt of an arylmethane dye base characterized by a logarithmic dissociation constant below 7 and an organic sulfinic acid whereby physical contact of the associated compound and the silicate dissociates the compound to the intensely colored cation of the dye and produces color on the silicate surface.*

7 Claims, 2 Drawing Figures

ASSOCIATED DYE SALTS AND METHOD OF FORMING COLORED INDICIA THEREWITH

ASSOCIATED DYE SALTS AND METHOD OF FORMING COLORED INDICIA THEREWITH

Figure 1:
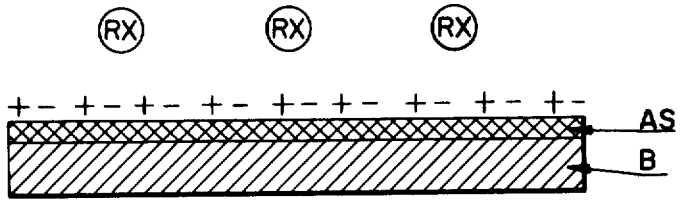

WHEREIN (RX) IS AN ASSOCIATED DYE SALT
AS IS A COATING CONTAINING AN UNFIRED SILICATE
+− IS AN ELECTRIC DIPOLE ON THE SILICATE SURFACE
B IS A BASE WEB

WHEREIN R IS AN INTENSELY COLORED DYE CATION
$X^-$ IS AN ORGANIC SULFINIC ACID ANION
AS IS A COATING CONTAINING AN UNFIRED SILICATE
B IS A WEB BASE

ASSOCIATED DYE SALTS AND METHOD OF FORMING COLORED INDICIA THEREWITH

Matter enclosed in heavy brackets [ ] appears in the original patent but forms no part of this reissue specification; matter printed in italics indicates the additions made by reissue.

*CROSS-REFERENCE TO RELATED APPLICATIONS*

This application is a continuation-in-part of my copending application Ser. No. 800,377, filed on Mar. 19, 1959, for "Colorless Dye Salts and Nonstaining Transfer Sheet," now abandoned, *said application Ser. No. 800,377 in turn being a continuation-in-part of application Ser. No. 658,249, filed May 10, 1957, now abandoned, and said application Ser. No. 658,249 being a continuation-in-part of applications Ser. Nos. 533,877 and 533,878 both filed Sept. 12, 1955 and both now abandoned.*

The purpose of this invention is to describe a new type of recording system which depends for its action upon the equilibrium between a colored and a colorless dye salt. In particular, it has been found that the sulfinic acid salts and hydrazoic acid salts of intensely colored cations from diarylmethane and triarylmethane dye bases characterized by a logarithmic dissociation constant below 7 may exist in two forms: (1) an intensely colored dissociated form and (2) a substantially colorless associated form depending upon environmental conditions (solvent, temperature, etc.) which prevail.

This equilibrium has been admirably adapted to the preparation of nonstaining nonaqueous recording solutions for use in marking fluids, spirit duplicating, and as a recording media for nonstaining copy papers.

Previous workers in the field of colorless or nonstaining recording systems have always utilized chemical reactions between two active chemical components to obtain colored characters. For example, earlier workers, such as Groak, used metathetical ionic reactions between colorless cations and anions to form colored compounds, such as iron gallate. These reactions required moist conditions, and coatings containing such hygroscopic reagents were subject to premature rupture and discoloration. More recent workers, such as Davis and Thacker, have used nonaqueous systems for their reactions, such as the formation of a colored salt from a colorless base and a strong acid. All of these systems are chemical in nature and possess certain inherent defects in their actual commercial application.

Inasmuch as the major objection to the use of triarylmethane dye solutions in recording systems (marking fluids, typewriter ribbons, copy papers, etc.) is due to the ability of these dyes to stain skin and clothing an intense color, what has long been desired is an intensely colored dye salt which will not stain ordinary surfaces but will give an intense character only on a desired surface.

The author of the present invention has now found that the sulfinic acid salts and hydrazoic acid salts of diarylmethane and triarylmethane color bases characterized by a logarithmic dissociation constant below 7 may exist completely in the colored dissociated form, completely in the substantially colorless associated form, or in equilibrium between the two forms depending upon the ionization power of their environment.

In particular, it has been found that upon exposure to heat or upon contact with highly ionizing reagents or solids such as unfired kaolin, bentonite, and similar surfaces bearing a high permanent electric dipole moment, the colorless associated form dissociates into ions, one of which is intensely colored, which dissociation can be used for the recording of data and for duplicating purposes.

It appears that equilibrium exists between the forms:

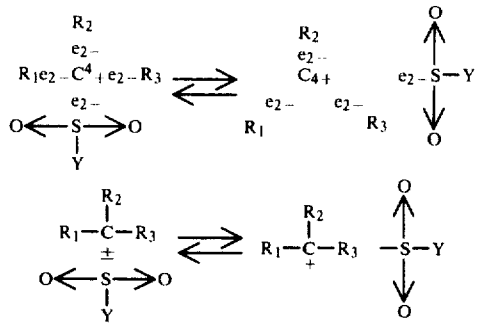

which may be written in the form of Kekulé bonds as:

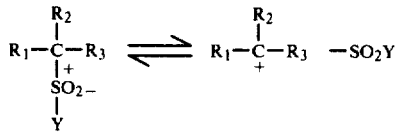

where Y is chosen from the group consisting of aliphatic radicals having from one to twelve carbon atoms, phenyl, and substituted phenyl.

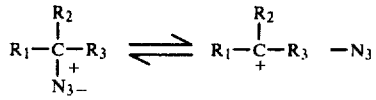

in which the quanticule ($e_2-v$) of the sulfinate and azide ions contribute to the screening of the central carbon core only under low energy conditions; but upon exposure to higher energy, ionizing conditions, the central core is now adequately screened by only three substituents, and the molecule ionizes.

The peculiar stability of Crystal Violet Cyanide apparently is due to the fact that the electrically unbalanced cyanide ion effectively distorts the Crystal Violet ion so that maximum screening of the central core is achieved. So strongly screened is the central core in Crystal Violet Cyanide that dissociation occurs only under the high-energy conditions existing in the far ultra-violet region; and Crystal Violet Cyanide cannot be dissociated by heat or chemical action alone (lead peroxide will not oxidize it to Crystal Violet dye). Only in alcohol solutions (and in similar ionizing solvents) exposed to extremely high-energy ionizing radiation will the molecule ionize. This is not remarkable; for in this high-energy spectral region even oxygen dissociates to form ozone.

The dye salts of the present invention are chosen so that an essentially unsaturated core is completely screened by other groups only at low-energy (normal) conditions. Upon exposure to a high-energy environment, the core is then adequately screened by fewer groups; and the molecule dissociates into ions, at least one of which is colored. The dye salt to be used for a given application becomes a matter of determining the screening characteristics of the ions used. Previous experience in this area before the work of the author of the present invention is extremely limited. Many chemists assume that all organic azides are dangerously explosive; yet the author of the present invention has found certain organic azides (which are ionic in character but are not ionized) to be quite stable. Michler's hydrol azide, for example, melts at 80° C. and begins to decompose slowly at 160°-220° C., resembling sodium azide in this respect. No explosion has ever been obtained under normal working conditions with this compound, which is very soluble in toluene.

The only know member of this type, that from Michler's hydrol and benzenesulfinic acid (called phenyl-(4,4'-bis(dimethylamino)-benzhydryl)-sulfone) is completely insoluble at room temperature in the usual solvents used in recording systems. It has been found by the author of the present invention, however, that the use of aliphatic sulfinic acids and the use of substituted aromatic sulfinic acids, where the substituent is one of a series of oil-solubility promoting (lipophilic) groups such as alkyl, halogen, ether, etc., gives solvent-soluble sulfinates which are stable, substantially colorless, and non-staining to skin, paper, and textile fibers.

From the viewpoint of classic theory, these salts are for the most part the salts of weak bases and moderately strong acids. It is axiomatic in chemistry that the salts of strong bases-strong acids (sodium chloride, Crystal Violet Chloride, etc.) are always one hundred percent dissociated; but the salts of weak acids-strong bases and of weak bases-strong acids may be more or less associated depending upon environmental conditions. It would appear that one method of adapting other dye bases for use in the present invention would be to lower their base strength by suitable substitution. This is achieved in quanticule-donating systems by incorporating quanticule-attracting groups (nitro, trifluoromethyl, etc.) into the aryl group.

It was found that Crystal Violet dye, for example, could be nitrated to give 2,2'-dinitro-4,4',4''-tris(dimethylamino)-triphenylcarbinol, a weak base. This weak base can form undissociated dye salts with suitable anions as well as dissociated dye salts with other anions. Similarly, 2-nitro-4',4''-bis(dimethylamino-triphenylcarbinol is easily prepared for use in the present invention, as are other nitrated triarylmethane dye derivatives. While these nitrated dye bases containing only one nitro group are not always completely nonstaining, their associated salts are nonstaining and one can use associated salts for purposes where the free color bases are unsatisfactory.

Although the associated salts of nitrated triarylmethane dye bases are not completely colorless, being a light orange in color, transfer sheets containing these salts are the same light yellow color as standard yellow commercial papers and may be substituted into any form where a pale-colored base web is not objectionable. The non-staining nature of solutions of these salts renders their use far more attractive than the violet-colored, strongly-staining solutions of Methyl Violet Oleate.

The use of other meta-directing groups than the nitro group to reduce the base strength of triarylmethane dyes, such as trifluoromethyl and N,N-dialkylsulfonamido, will also furnish intermediates for the dye salts of the present invention. In these cases, the parent carbinol bases are substantially colorless, as are the resultant salts.

The salts of the present invention are all water-insoluble. Inasmuch as water is ionizing in nature, colorless solutions of these associated salts in acetone, alcohol, etc. become colored upon addition of water; for this reason the associated salts of the present invention should be used only in systems which do not have an appreciable water-content. Water-soluble salts of triarylmethane color bases are discussed in my copending application, Stable Triarylmethanesulfonic Acid Derivatives and Method of Forming Colored Indicia Therewith, Ser. No. 200,056, filed June 5, 1962.

The author has found that certain unfired silicates such as diatomaceous earth, kaolin, and bentonite possess high ionizing properties apart from their acid-base and oxidation-reduction properties. A clay molecule may be pictured as a large molecule of polymerized silica containing calcium, iron, and other cations. The iron silicate structure gives oxidizing properties to the clay and the calcium silicate gives acidic and ion-exchange properties to the clay; but it is the polymerized silica structure which gives a high electric dipole moment over the surface of the clay. This electric dipole is stable until the clay is calcined at high temperature, at which point the electric dipole moment disappears; and the aforementioned clays lose their ionizing properties.

Although other workers in the recording field, notably Bjorksten, Green, and Bour, have utilized certain silicates in recording papers, no worker has yet utilized the clays as other than chemical reagents. It is the purpose of this application to describe a practical utilization of the ionizing properties of silicates possessed of a high dipole moment.

The compounds of the present invention offer certain advantages over the color bases from which they are derived: (1) As the method of color formation by dissociation is different from the method of color formation by reaction of a dye base with an acid, there is oftentimes a marked increase in the rate of reaction. Dinitro Crystal Violet Base, for example, when pure forms a colored salt with acid silicates only very slowly (3-5 minutes or longer); but the dissociation of Dinitro Crystal Violet Azide to the colored ion under the influence of the acid silicates' electric dipole moment is immediate, and the intense colored print appears immediately upon recording with this azide. (2) The stability and reactivity of certain color bases, such as mononitro Crystal Violet Base, which have logarithmic dissociation constants between 5 and 7, is improved, and this is of value in manifolding sheets which must be stored indefinitely before use. (3) The associated salts formed can be more safely handled without chemical staining than can the more reactive color bases because of lower water-solubility (i.e., they are less-soluble in the skin perspiration).

While the compounds of the present invention cannot be used in aqueous soluitons and are more reactive than the water-soluble triarylmethanesulfonates, which are disclosed in my copending application, they do, however, have applications in recording systems where a non-volatile color-former is desired which will record colored indicia on selected areas from a lipophilic solvent.

Description

Michler's hydrol (4,4'-bis-(dimethylamino)-benzhydrol), ethyl hydrol (4,4'-bis-(diethylamino)benzhydrol), Dinitro Crystal Violet Carbinol, and other compounds of this type are dissolved in glacial acetic acid to form the intensely colored acetate. To this colored dye solution is added the desired sulfinic acid either as the free sulfinic acid or as its sodium salt (the sodium salt form is preferred because the sulfinic acid salts have greater storage stability than the free sulfinic acids which tend to polymerize upon standing in the air) until the intense color is discharged or until the solution becomes a markedly lighter color. The sulfinate may deposit at this time or may be retained in solution. The solution is then poured into cold water or cold ammonium hydroxide solution to precipitate out the water-insoluble sulfinate. The precipitate is collected, washed with water, dried, and recrystallized from alcohol to give the colorless sulfinate.

The reaction may be carried out in dilute aqueous acids or in acidic alcohol. All that is necessary is that the dye base should be converted to the colored salt before adding the sulfinate ion. The sulfinic acids may be obtained by decomposition of a sulfur-dioxide containing diazonium salt solution (Gattermann reaction), by reduction of the sulfonyl chloride with zinc duct or sodium sulfite, or by the aluminum chloride catalyzed addition of sulfur dioxide to an olefinic or aromatic compound. The yield of colorless sulfinate is usually above ninety percent and is often quantitative.

The melting points of these colorless dye salts depends on the rate of heating and cannot be used to characterize pure isomers (ortho, meta, para, for example); for comparison purposes, however, the melting points of some of the more simple colorless dye salts are listed below:

| | | |
|---|---|---|
| Michler's hydrol azide | °C. | 79-80 |
| Michler's hydrol p-toluenesulfinate | °C. | 183-184 |
| Michler's hydrol xylenesulfinate | °C. | 156-157 |
| Michler's hydrol 2,5-dichlorobenzenesulfinate | °C. | 177-178.5 |
| Michler's hydrol 3,4-dichlorobenzenesulfinate | °C. | 191-192 |
| Michler's hydrol p-ethoxybenzenesulfinate | °C. | 161-162 |
| Ethyl hydrol p-toluenesulfinate | °C. | 142.5-143.5 |
| Ethyl hydrol xylenesulfinate | °C. | 130-131 |
| Michler's hydrol ethylsulfinate | °C. | 148.5-150 |
| Michler's hydrol n-butylsulfinate | °C. | 112-114 |
| p-Methoxy-p-dimethylaminobenzhydryl azide | | Oil |
| p-Methoxy-p-dimethylaminobenzhydryl p-toluenesulfinate | °C. | 84-86 |
| Michler's hydrol dodecylbenzenesulfinate | | Oil |

The most light-stable colored indicia are obtained from the salts of substituted triarylmethane color bases such as:

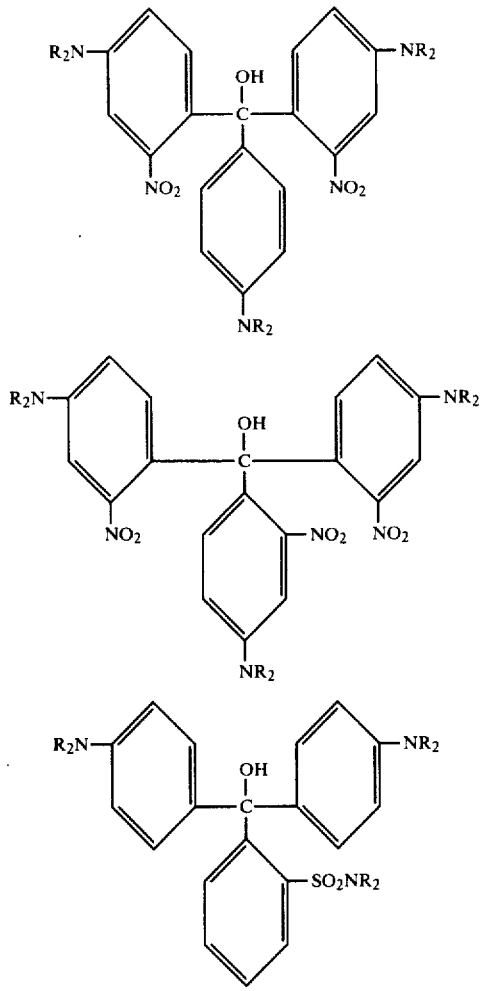

where R is a lower alkyl group or hydrogen.

Color is developed in the associated dye salts after they have been placed or transferred to a receiving sheet, as imprinted indicia, by exposing said receiving sheet to a highly ionizing environment. Three highly ionizing environments are particularly useful for this purpose. These are a polarizing reagent, a high temperature, and a surface carrying a high permanent electric dipole moment. For example, if a recording fluid comprising a sulfinate salt and a solvent therefor is used to imprint indicia on an ordinary paper, after the solvent has evaporated color is imparted to the imprinted dye salt by exposing the paper either to an elevated temperature or to a polarizing reagent, such as ammonium persulfate, water, etc. In other words, color is imparted to the dye salt either by heating the imprinted dye salt or an imprinted dispersion thereof in a nonvolatile vehicle, or alternatively by exposing the paper to a polar developing fluid. The developing fluids preferably contain water, but water alone cannot be used by itself since the sulfinate dye salts are insoluble therein. It is necessary therefore in the case of water as a developing reagent to use in addition to water a mutual solvent for it and the sulfinate dye salt. Among useful solvents are acetone, ethanol and other alcohols, dimethyl-sulfoxide and the like. Alternatively, if the receiving sheet is coated with a film comprising a material having a permanent electric dipole moment, this surface comprises a third type of highly ionizing environment. The associated dye salts of this invention dissociate immediately upon contact with a surface of this type, thus giving a highly colored cation directly. A recording fluid or a transfer sheet employing associated dye salts can be used therefore in conjunction with a specially coated paper having a high permanent electric dipole moment to provide novel recording systems.

Exemplary of the recording fluids of this invention is a recording fluid comprising a solution of Michler's hydrol diethylbenzenesulfinate in oleic acid, which solution can be used to saturate a stamp pad. When such a recording fluid is transferred by means of a stamp to a fabric coated with a material having a high permanent electric dipole moment, the indicia imparted thereto become colored immediately. Alternatively, the stamp can be used to transfer the recording fluid to an ordinary sheet of paper in which case the color of the imparted indicia is developed by contacting the paper with a developing fluid comprising, for example, 25 percent water and 75 percent acetone.

By way of further illustration, recording systems of this invention can be prepared employing ethyl hydrol xylenesulfinate or an equivalent colorless dyestuff salt of the type described above. In a recording system of this type, such as carbon paper, the associated dye salt is dispersed in a heavy oil or wax-oil mixture and applied to a master sheet. Typewriter type, or a stylus, when pressed against the surface of this master sheet, will cause some of the associated dye salt to be transferred to a receiving sheet. If the receiving sheet has an ionizing surface, an immediate color will develop comprising the colored cation of the dye. If an ordinary sheet is used, the color can be developed by the use of a developing fluid or by heat as previously described.

The surfaces whose use is indicated in conjunction with the associated dye salt of this invention are those which, as previously stated, bear a high permanent electric dipole moment. Numerous examples of this type of surface are known to the art. Unfired silicates are particularly useful in this regard. Examples of suitable ionizing surfaces are those prepared from unfired silicates such as kaolin, bentonite, and the like. Papers bearing such a coating can be manufactured by methods well known to the art.

The recording fluids and recording systems of this invention will not stain skin or fabrics until the final stage of their use when the color is developed in situ on an ionizing surface or by the use of developing chemicals or by heat. In addition, "carbon" and other copy papers and master sheets prepared from the associated dye salts of this invention are either colorless or very lightly-colored. Thus, the recording fluids and recording systems provided by this invention are especially advantageous when compared with those commonly employed. Furthermore, since the surfaces of most fabrics are not highly ionizing for the associated salts of the present invention, the recording fluids employed by this invention are nonstaining and therefore are particularly useful for the printing of price tags or quality control tags on bolts of goods, dresses, clothing and the like.

An example of a recording solution contains a colorless associted dye salt is a 2% solution of Michler's hydrol azide in paraffin oil. This gives an intense blue coloration with an unfired kaolin-coated receiving sheet.

Another example of this invention is a 2.5% solution of dinitro Crystal Violet Azide in toluene. This gives an immediate blue-black coloration with an unfired kaolin-coated receiving sheet.

Another example of this invention is a 3% solution of ethyl hydrol xylenesulfinate in distilled oleic acid. This gives an intense blue coloration with an unfired diatomaceous earth-coated paper. A blue coloration is also obtained when the colorless prints on ordinary paper are heated to about 150°-175° C.

Another example of this invention is a 2.5% solution of Michler's hydrol-xylenesulfinate in chlorinated diphenyl. This gives an intense blue coloration upon contact with an activated silica-coated paper.

Still another example of this invention is a 3% solution of p-methoxy-p'-dimethylaminobenzhydryl azide in chlorinated diphenyl. This gives a wine-red color upon contact with an activated silica-coated paper. This has very poor light-stability.

Still another example of this invention is a three percent solution of dinitro Fuchsin-xylenesulfinate in chlorinated diphenyl. This gives a magenta color upon contact with an activated silica-coated paper.

Similar recording fluids can be prepared by substituting other associated salts of diarylmethane and triarylmethane dyes falling within the scope of this invention in the above nonionizing solvents or their equivalents. These recording fluids will yield colored indicia upon contact with a highly ionizing surface or, if printed upon a plain surface, the color can be developed by contacting the surface with an ionizing reagent such as aqueous alcohol or simply by applying heat to the surface.

For the preparation of transfer sheets, the associated salts of arylmethane dyes can be dissolved in a hot wax melt and then coated onto the base web in a standard hot melt coating machine. The colorless dye salt should be sufficiently soluble in the cold wax mixture so that it does not crystallize out from the hot melt upon cooling. In dissolving the associated dye salt, temperatures in excess of 110° C. should be avoided since the compounds will dissociate into ions at temperatures much above 135° C.

In general, in preparing transfer sheets the wax is melted, a nonvolatile, nonionizing plasticizing oil is added, as for example paraffin oil or oleic acid, and the associated dye salt is dissolved in the hot melt, usually at about 85° C. If a filler or an activator is desired, it can be dispersed in the hot melt at this point. Among useful fillers are starches, starch derivatives, and a fired diatomaceous earth sold under the trademark "Dicalite."

More specifically, a transfer sheet using the recordng fluids of this invention is prepared by melting together 35 parts of Gersthofen wax, 15 parts of high-melting (155° F.) paraffin wax, and 50 parts of a nonvolatile paraffin plasticizing lubricating oil with a flash point over 400° F. and a viscosity of 150 Saybolt seconds. To this mixture is added at 180 F. an amount of ethyl hydrol xylenesulfinate equal to 2.5 percent of the amount of lubricating oil used. The solution is stirred until clear, and the molten wax is applied to paper by standard coating procedures to give a coating weight of 5 lbs./ream.

Another example of the process of preparation of a transfer sheet utilizing the recording fluids of the present invention comprises melting together 36 parts by weight of refined ouricury wax, 19 parts by weight of a high melting paraffin wax, and 45 parts by weight of oleic acid containing 3 percent Michler's hydrol diethylbenzenesulfinate. This melt is coated on paper at a temperature near the solidifying point in order to minimize "strike through" into the base paper. A transfer sheet prepared in this fashion, when used in conjunction with a receiving sheet coated with unfired diatomaceous earth, gives an intense blue transfer pattern on the receiving sheet.

It should be clearly understood that the invention is not limited to the examples set forth but is generally applicable to any associated dye salt which is water-insoluble and which can be ionized to a colored cation by application of heat or by contact with highly ionizing liquids or solids.

It is also to be understood that the associated dye salts of this invention may be used to make recordings on appropriate surfaces by any desired or conventional method or technique. For instance, the salt dissolved in a solvent may be used for direct printing on appropriately coated paper or the salt may be utilized as a component of the coating of a transfer sheet. In other words, the recording media of this invention may be used in a great variety of recording, printing, and manifolding systems.

Figure 2:
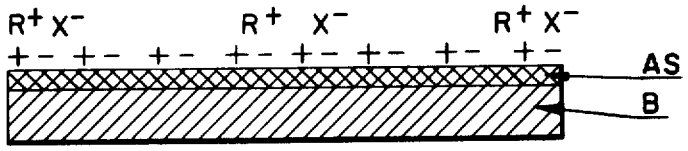

The invention will be better understood in relation to the accompanying drawing which is a diagrammatic representation of the physical dissocation which takes place in the practice of this invention. FIG. 1 of the drawing discloses colorless associated molecules $\boxed{RX}$ of the associated dye salt of an organic sulfinic acid and an arylmethane dye base characterized by a logarithmic dissociation constant below 7 wherein $R^+$ is the dye cation and $X^-$ is the sulfinic acid anion and an unfired silicate surface S characterized by high ionizing power wherein +—+— represents the electric dipole moment on the silicate surface. FIG. 2 represents the change which takes place when the colorless associated molecules contact the electric dipole moment of the ionizing surface whereby dissociation of the colorless salt $\boxed{RX}$ to the intensely colored cation $R^+$ of the dye occurs to form color on the ionizing surface.

Having described my invention, I claim:

1. The method of printing which comprises applying to an unfired silicate surface characterized by high ionizing power a substantially colorless associated salt of an arylmethane dye base characterized by a logarithmic dissociation constant below 7 and an organic sulfinic acid whereby physical contact of the associated compound and the silicate dissociates the compound to the intensely colored cation of the dye and produces color on the silicate surface.

2. The method of printing which comprises applying to a surface characterized by high ionizing power a substantially colorless liquid, said liquid comprising a substantially colorless associated salt wherein the anion is an organic sulfinic acid anion and the cation is a colored dye cation of an arylmethane dye base characterized by a logarithmic dissociation constant below 7, whereby physical contact of the colorless associated compound and the ionizing surface dissociates the compound to the intensely colored cation of the dye and produces color on the ironizing surface.

3. The method of claim 2 wherein the colored dye cation of an arylmethane dye base characterized by a logarithmic dissociation constant below 7 is an N,N'-alkylated-4,4'-diaminobenzhydryl cation.

4. The method of claim 2 wherein the colored dye cation of an arylmethane dye base characterized by a logarithmic dissociation constant below 7 is a triarylmethane dye cation.

5. The method of printing which comprises applying to a surface having thereon a coating comprising an unfired silicate characterized by high ionizing power a substantially colorless liquid which comprises an oil-soluble, water-insoluble salt wherein the anion is an organic sulfinic acid anion and the cation is a colored dye cation of an arylmethane dye base characterized by a logarithmic dissociation constant below 7, whereby physical contact of the colorless associated salt and the ionizing silicate dissociates the salt to the colored cation of the dye to provide a colored print.

[6. A recording fluid comprising a solution in a nonaqueous solvent of an associated arylmethane dye salt wherein the anion is an organic sulfinic acid anion and the cation is the intensely colored cation of an arylmethane dye base characterized by a logarithmic dissociation constant below 7.]

[7. A recording fluid comprising a solution in a nonaqueous solvent of an associated dye salt wherein the anion is an organic sulfinic acid anion and the cation is an N,N'-alkylated-4,4'-diaminobenzhydryl cation.]

[8. A recording fluid comprising a solution in a nonaqueous solvent of an associated dye salt wherein the anion is an organic sulfinic acid anion and the cation is the intensely colored cation of Dinitro Crystal Violet Base.]

[9. A new composition of matter comprising the associated dye salt wherein the anion is an organic sulfinic acid anion and the cation is the intensely colored cation of Dinitro Crystal Violet Base.]

10. The method of printing which comprises applying to a surface characterized by high ionizing power a substantially colorless associated salt of an arylmethane dye base characterized by a logarithmic dissociation constant below 7 and an organic sulfinic acid whereby physical contact of the associated compound and the ionizing surface dissociates the compound to the intensely colored cation of the dye and produces color on the ionizing surface.

[11. A recording fluid comprising a solution in a nonaqueous solvent of a substantially colorless associated dye salt wherein the anion is a xylenesulfinic acid anion and the cation is an N,N'-alkylated-4,4'-diaminobenzhydryl cation.]

[12. A recording fluid comprising a solution in a nonaqueous solvent of a substantially colorless associated dye salt wherein the anion is a diethylbenzenesulfinic acid anion and the cation is an N,N'-alkylated-4,4'-diaminobenzhydryl cation.]

[13. A new composition of matter comprising the substantially colorless associated dye salt wherein the cation is an N,N'-alkylated-4,4'-diaminobenzhydryl cation and the anion is a xylenesulfinic acid anion.]

[14. A new composition of matter comprising the substantially colorless associated dye salt wherein the cation is an N,N'-alkylated-4,4'-diaminobenzhydryl cation and the anion is a diethylbenzenesulfinic acid anion.]

[15. A new composition of matter comprising the substantially colorless associated dye salt of xylenesulfinic acid and 4,4'-bis(dimethylamino)benzhydrol.]

[16. A new composition of matter comprising the substantially colorless associated dye salt of diethylbenzenesulfinic acid and 4,4'-bis(dimethylamino)benzhydrol.]

*17. The method according to claim 10 wherein the associated salt is Michler's hydrol p-toluenesulfinate.*

* * * * *